United States Patent
Yoon et al.

(10) Patent No.: US 9,482,915 B2
(45) Date of Patent: Nov. 1, 2016

(54) DISPLAY APPARATUS

(71) Applicant: Samsung Display Co., Ltd., Yongin, Gyeonggi-Do (KR)

(72) Inventors: Hyoyul Yoon, Seoul (KR); Jaiku Shin, Yeoju-si (KR)

(73) Assignee: Samsung Display Co., Ltd., Gyeonggi-do (KR)

( * ) Notice: Subject to any disclaimer, the term of this patent is extended or adjusted under 35 U.S.C. 154(b) by 42 days.

(21) Appl. No.: 14/469,992

(22) Filed: Aug. 27, 2014

(65) Prior Publication Data
US 2015/0253613 A1 Sep. 10, 2015

(30) Foreign Application Priority Data
Mar. 6, 2014 (KR) .................. 10-2014-0026717

(51) Int. Cl.
G02F 1/1333 (2006.01)
G02F 1/1345 (2006.01)
G02F 1/1368 (2006.01)

(52) U.S. Cl.
CPC . G02F 1/13452 (2013.01); *G02F 2001/13685* (2013.01)

(58) Field of Classification Search
CPC .............. G02F 1/133308; G02F 2001/133331
USPC .......................................................... 349/58
See application file for complete search history.

(56) References Cited

U.S. PATENT DOCUMENTS

| 7,435,914 | B2 | 10/2008 | Cheng |
| 7,956,975 | B2 | 6/2011 | Choi |
| 2001/0002145 | A1* | 5/2001 | Lee .................... G02F 1/133308 349/58 |
| 2007/0034402 | A1* | 2/2007 | Cheng ................. G02F 1/13452 174/260 |
| 2008/0030643 | A1* | 2/2008 | Choi .................... G02F 1/13452 349/58 |
| 2008/0111940 | A1* | 5/2008 | Chang ............... G02F 1/133308 349/58 |
| 2012/0105344 | A1* | 5/2012 | Ko .......................... G06F 3/044 345/173 |
| 2012/0250289 | A1 | 10/2012 | Kao et al. |
| 2013/0051071 | A1* | 2/2013 | Lee .................... G02F 1/133308 362/611 |
| 2013/0154719 | A1* | 6/2013 | Lee ......................... G06F 3/041 327/517 |
| 2013/0277094 | A1* | 10/2013 | Lee ........................ H05K 3/361 174/254 |
| 2013/0293816 | A1* | 11/2013 | Jung ................. H01L 23/49827 349/139 |
| 2014/0176872 | A1* | 6/2014 | Miyazaki ............. G02B 6/0088 349/65 |
| 2014/0184937 | A1* | 7/2014 | Lim ...................... H01L 27/323 349/12 |

FOREIGN PATENT DOCUMENTS

| JP | 2005-234335 A | | 9/2005 | |
| JP | 2006-235349 | * | 9/2006 | .............. G02F 9/00 |
| JP | 2006-235349 A | | 9/2006 | |
| KR | 10-2004-0000143 A | | 1/2004 | |

(Continued)

*Primary Examiner* — Sang V Nguyen
(74) *Attorney, Agent, or Firm* — Knobbe Martens Olson & Bear LLP

(57) ABSTRACT

A display apparatus is disclosed. In one aspect, the display apparatus includes a first display substrate including i) a first plane on which an image is displayed and ii) a second plane opposite to the first plane. The display apparatus also includes a second display substrate formed at least partially overlapping second plane, a guiding portion bent and connected to at least one of the first and second display substrates, a mold frame accommodating and supporting the second display substrate, and a flexible printed circuit board (FPCB) including i) a first area attached to the second plane of the first display substrate and ii) a second area connected to and guided by the guiding portion, wherein the FPCB is bent at least partially around the mold frame.

21 Claims, 7 Drawing Sheets

(56) References Cited

FOREIGN PATENT DOCUMENTS

| KR | 10-2006-0107239 | A  | 10/2006 |
| KR | 10-0762700 | B1 | 9/2007 |
| KR | 10-1012803 | B1 | 1/2011 |

* cited by examiner

DISPLAY APPARATUS

CROSS-REFERENCE TO RELATED APPLICATIONS

A claim for priority under 35 U.S.C. §119 is made to Korean Patent Application No. 10-2014-0026717 filed Mar. 6, 2014, in the Korean Intellectual Property Office, the entire contents of which are hereby incorporated by reference.

BACKGROUND

1. Field

The described technology generally relates to a display apparatus.

2. Description of the Related Technology

Flat panel displays (FPDs) have been developed to replace the cathode-ray tube displays that are much thicker and use excessive power. FPDs can include organic light-emitting diode (OLED) displays, liquid crystal displays (LCDs), plasma displays, and so on.

A display apparatus can include a display panel, a printed circuit board (PCB), and a flexible printed circuit board (FPCB). An FPCB is typically formed of flexible material which can cause the FPCB to be easily bendable.

SUMMARY OF CERTAIN INVENTIVE ASPECTS

One inventive aspect is a display apparatus capable of lengthening a lifetime of an FPCB, improving a problem of cracking connection lines in the FPCB.

Another aspect is a display apparatus that can include a first display substrate, a second display substrate, a mold frame, an FPCB, and a PCB.

The first display substrate can include a first plane on which an image is displayed, and a second plane opposite to the first plane. The second display substrate can be opposite to the second plane of the first display substrate.

The mold frame can have an accommodation room internally, support the second display substrate, and include a bent guide frame.

The FPCB can include a first area attached to the second plane of the first display substrate. The FPCB can include a second area contacting and guided by the guide frame, and bend toward the mold frame.

The PCB can be connected to the FPCB, providing a drive signal to the first display substrate.

A position at which the maximum bending stress is generated against the FPCB can be different from a position at which the maximum shearing stress is generated against FPCB.

The position at which the maximum bending stress is generated against the FPCB can be within the second area. The position at which the maximum shearing stress is generated against the FPCB can be within the first area.

The mold frame can further include a bottom frame and a sidewall frame. The sidewall frame can extend from an edge of the bottom frame.

The guide frame can be connected to an upper part of the sidewall frame and convexly bent toward an edge direction from the center of the first display substrate.

The first display substrate can further include an insulation substrate and a pad electrode. The insulation substrate can be configured to define a display area and a non-display area therein. The pad electrode can be formed on the insulation substrate and attached to the FPCB while overlaying the non-display area.

The guide frame can be protrude in the edge direction from the center of the first display substrate. The guide frame can protrude more compared to the pad electrode.

The first and second areas of the FPCB can be isolated from each other in a predetermined distance. The guide frame and the first area of the FPCB can be isolated from each other in a predetermined distance.

Another aspect is a display apparatus that can include a first display substrate, a second display substrate, a guiding portion, a mold frame, an FPCB, and a PCB. The first display substrate can include a first plane on which an image is displayed, and a second plane opposite to the first plane. The second display substrate can be opposite to the second plane of the first display substrate. The guiding portion can be bent and connected to at least one of the first and second display substrates. The mold frame can have an accommodation room internally and support the second display substrate. The FPCB can include a first area attached to the second plane of the first display substrate. The FPCB can also include a second area contacting and guided by the guiding portion. The FPCB can bend towards the mold frame. The PCB can be connected to the FPCB, providing a drive signal to the first display substrate.

A position at which the maximum bending stress is generated against the FPCB can be different from a position at which the maximum shear stress is generated against FPCB. The position at which the maximum bending stress is generated against the FPCB can be within the second area. The position at which the maximum shear stress is generated against the FPCB can be within the first area.

The second display substrate can further include an insulation substrate. The guiding portion can be formed in the outside of the insulation substrate and convexly bent toward an edge direction from the center of the second display substrate.

The guiding portion can be more protruded, comparing to the mold frame, toward the edge direction from the center of the second display substrate.

The guiding portion can contact with the second plane of the first display substrate.

Another aspect is a display apparatus comprising a first display substrate, a second display substrate, a mold frame, a flexible printed circuit board (FPCB), and a printed circuit board (PCB). The first display substrate includes a first plane on which an image is displayed, and a second plane opposite to the first plane. The second display substrate is formed at least partially overlapping second plane. The mold frame is configured to accommodate and support the second display substrate, wherein the mold frame includes a guide frame that is bent. The FPCB includes a first area attached to the second plane of the first display substrate, and a second area connected to and guided by the guide frame, wherein the FPCB is bent at least partially around the mold frame. The PCB is electrically connected to the FPCB and configured to provide a drive signal to the first display substrate.

In the above display apparatus, a first position where substantially the maximum bending stress is generated against the FPCB is different from a second position where the maximum shear stress is generated against the FPCB. In the above display apparatus, the first position is within the second area. In the above display apparatus, the second position is within the first area.

In the above display apparatus, the mold frame further includes a bottom frame and a sidewall frame extending from an edge of the bottom frame towards the first display substrate. In the above display apparatus, the guide frame is connected to an upper part of the sidewall frame and convexly bent towards the FPCB from the center of the first display substrate.

In the above display apparatus, the first display substrate further comprises an insulation substrate including a display area and a non-display area and a pad electrode formed over the insulation substrate and attached to the FPCB and at least partially overlapping the non-display area. In the above display apparatus, the pad electrode protrudes in the same direction as that of the guide frame, wherein the guide frame protrudes more than the pad electrode.

In the above display apparatus, the first and second areas of the FPCB are isolated from each other by a predetermined distance. In the above display apparatus, the guide frame and the first area of the FPCB are isolated from each other by a predetermined distance.

The above display apparatus further comprises a top cover configured to accommodate the first display substrate, the second display substrate, the mold frame, the FPCB, and the PCB.

In the above display apparatus, the top cover comprises a bottom cover and a sidewall cover extending from an edge of the bottom cover and covering a side of the first display substrate.

The above display apparatus further comprises a liquid crystal layer formed between the first display substrate and the second display substrate and a backlight unit accommodated in the mode frame.

Another aspect is a display apparatus comprising a first display substrate, a second display substrate, a guiding portion, a mold frame, and a flexible printed circuit board (FPCB). The first display portion includes a first plane on which an image is displayed and a second plane opposite to the first plane. The second display substrate is formed at least partially overlapping second plane. The guiding portion is bent and connected to at least one of the first and second display substrates. The mold frame accommodates and supports the second display substrate. The FPCB includes a first area attached to the second plane of the first display substrate and a second area connected to and guided by the guiding portion, wherein the FPCB is bent at least partially around the mold frame.

In the above display apparatus, a first position where substantially the maximum bending stress is generated against the FPCB is different from a second position where substantially the maximum shear stress is generated against the FPCB. In the above display apparatus, the first position is within the second area. In the above display apparatus, the second position is within the first area.

In the above display apparatus, the second display substrate comprises an insulation substrate, wherein the guiding portion is formed adjacent to the insulation substrate and convexly bent toward the FPCB.

In the above display apparatus, the mold frame protrudes toward the FPCB, wherein the guiding portion protrudes more than the mold frame.

In the above display apparatus, the mold frame supports the guiding portion.

The above display apparatus further comprises a top cover accommodating the first display substrate, the second display substrate, the mold frame, and the FPCB.

In the above display apparatus, the guiding portion contacts with the second plane of the first display substrate.

DETAILED DESCRIPTION OF CERTAIN INVENTIVE EMBODIMENTS

Figure 1:
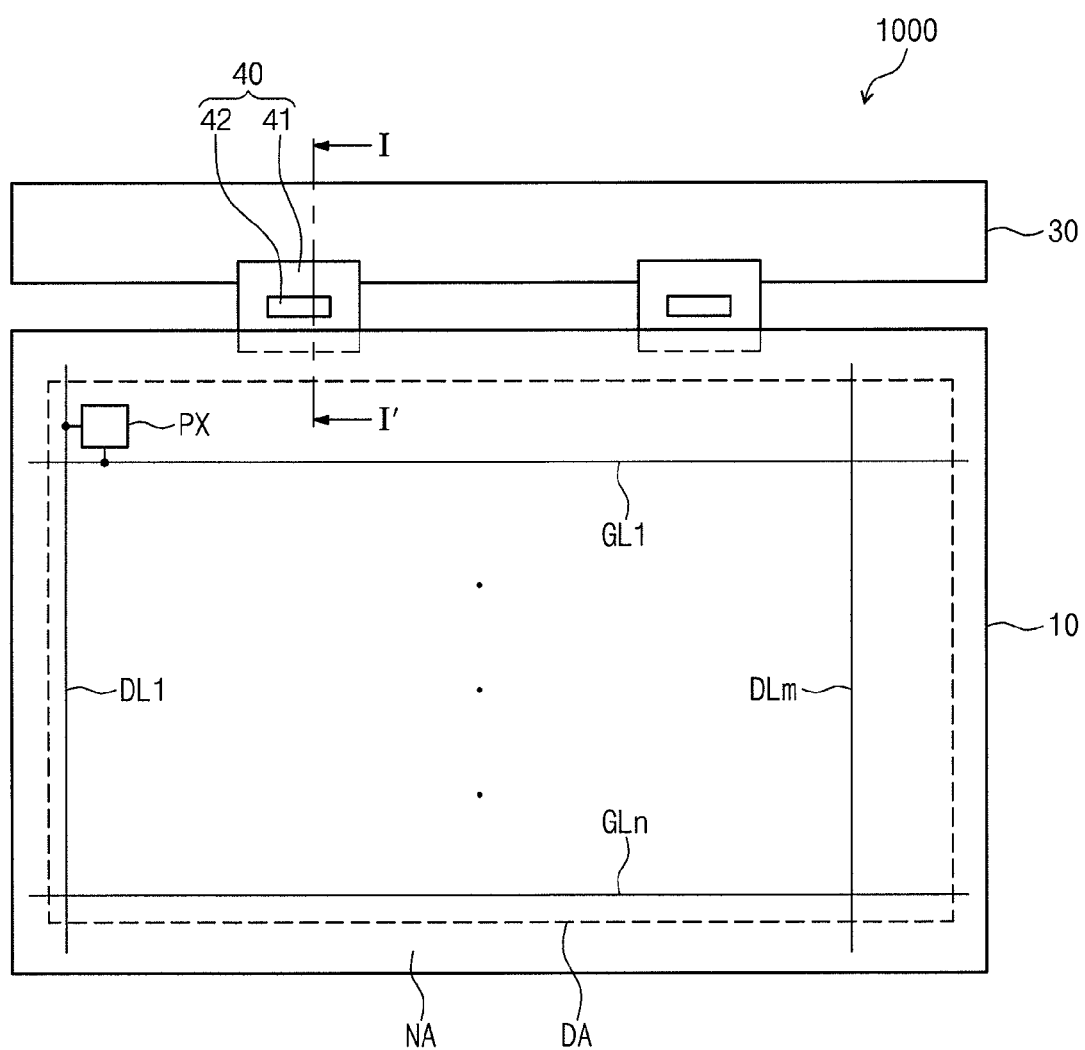
FIG. 1 is a plan view of a display apparatus according to an embodiment

A flexible printed circuit board (FPCB) generally includes a base film, one or more integrated circuit chips and interconnection lines which are formed in the base film. These components can be stressed by bending and shear stress due to thermal expansion. If the amount of stress is greater than a permissible limit thereof, the FPCB can be destroyed.

Embodiments will be described in detail with reference to the accompanying drawings. The described technology, however, can be embodied in various different forms, and should not be construed as being limited only to the illustrated embodiments. Rather, these embodiments are provided as examples so that this disclosure will be thorough and complete, and will fully convey the concept of the described technology to those skilled in the art. Accordingly, known processes, elements, and techniques are not described with respect to some of the embodiments of the described technology. Unless otherwise noted, like reference numerals denote like elements throughout the attached drawings and written description, and thus descriptions will not be repeated. In the drawings, the sizes and relative sizes of layers and regions can be exaggerated for clarity.

It will be understood that, although the terms "first", "second", "third", etc., can be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the described technology.

Spatially relative terms, such as "beneath", "below", "lower", "under", "above", "upper" and the like, can be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device can be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers can also be present.

The terminology used herein is for the purpose of describing particular embodiments only and is not intended to be limiting of the described technology. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers can be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this described technology belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein. In this disclosure, the term "substantially" includes the meanings of completely, almost completely or to any significant degree under some applications and in accordance with those skilled in the art. Moreover, "formed on" can also mean "formed over."

Hereinafter, exemplary embodiments of the described technology will be described in conjunction with accompanying drawings.

Figure 2:
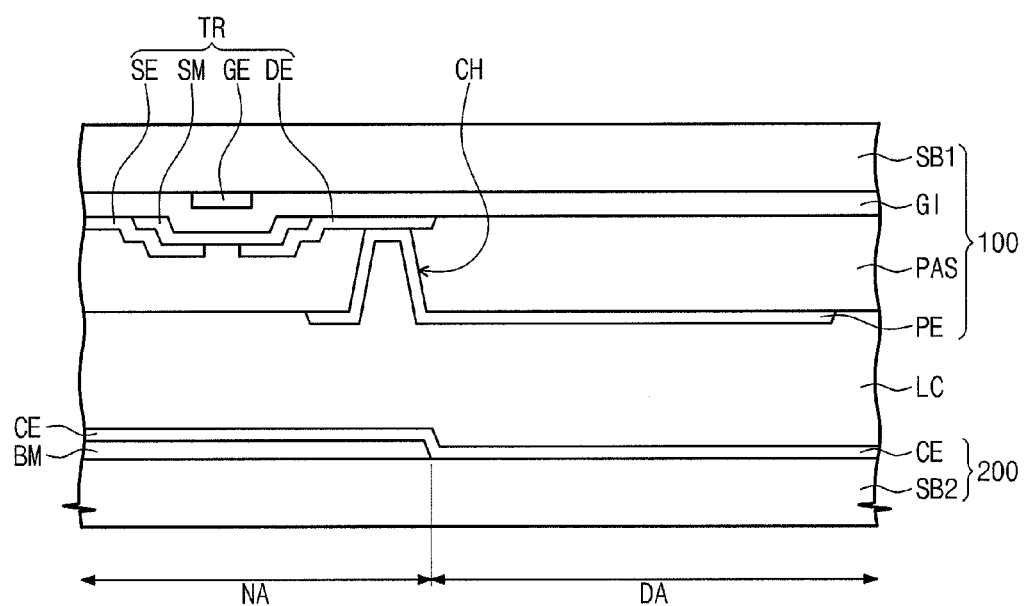
FIG. 2 is a sectional view taken from one pixel shown in FIG. 1.

FIG. 1 is a plan view of a display apparatus 1000 according to an embodiment of the described technology, and FIG. 2 is a sectional view taken from one pixel PX shown in FIG. 1.

Referring to FIGS. 1 and 2, the display apparatus 1000 includes a display panel 10, a printed circuit board (hereinafter, referred to as PCB) 30, and a flexible printed circuit board (hereinafter, referred to as FPCB) 40.

The display panel 10 can display an image. The display panel 10 can include various types of panels, such as liquid crystal display (LCD) panel, organic light-emitting diode (OLED) display panel, plasma display panel, electrophoretic display panel, electrowetting display panel, and so forth. Example embodiments will be described with reference to an LCD panel, but the described technology is not limited thereto.

The display panel 10 includes a display area DA where an image can be displayed, and a non-display area NA adjacent to the display area DA. The display area DA is a region where an image can be displayed and the non-display area NA is a region where an image is not displayed.

The display panel 10 can include a first display substrate 100, a second display substrate 200, and a liquid crystal layer LC. The first display substrate 100 is formed opposite to the second display substrate 200 with the liquid crystal layer LC interposed therebetween.

The first display substrate 100 can include a first insulation substrate SB1, gate lines GL1~GLn, data lines DL1~DLm, a thin film transistor (TFT) TR, and a pixel electrode PE.

The first insulation substrate SB1 can be a transparent substrate formed of glass, plastic, or silicon.

The gate lines GL1~GLn and the data lines DL1~DLm can be formed on the first insulation substrate SB1. The data lines GL1~GLn and the data lines DL1~DLm can be insulated from and intersected with each other. The gate lines GL1~GLn and the data lines DL1~DLm define a pixel area in which pixels PX are placed.

The thin film transistor TR can include a gate electrode GE, a semiconductor pattern SM, a source electrode SE, and a drain electrode DE. The gate electrode GE is formed on the first insulation substrate SB1. A gate insulation film GI can be formed on the gate electrode GE. The gate insulation film GI can be formed of an organic or inorganic insulation material. The semiconductor pattern SM is formed overlapping the gate electrode GE. The source electrode SE is connected to an end of the semiconductor pattern SM and the drain electrode DE is connected to the other end of the semiconductor pattern SM. A passivation film PAS can be formed on the drain electrode DE. The passivation film PAS can be formed of an organic or inorganic insulation material. The passivation film PAS can have a contact hole CH to at least partially expose the drain electrode DE.

The pixel electrode PE can be formed on the passivation film PAS, and connected to the drain electrode through the contact hole CH. The pixel electrode PE can a pixel voltage from the drain electrode DE.

The second display substrate 200 can include a second insulation substrate SB2, a shading layer BM, and a common electrode CE.

The shading layer BM is formed on the second insulation substrate SB2 and at least partially overlaps the non-display area NA. The shading layer BM can block incident light. The display area DA can be a region in which the shading layer BM is not formed, while the non-display area NA can be a region in which the shading layer BM is formed.

The common electrode CE can be formed on the shading layer BM. The common electrode CE can receive a substantially constant common voltage.

The liquid crystal layer LC can be formed between the first and second display substrates 100 and 200. The liquid crystal layer LC includes a plurality of liquid crystal molecules that can change molecular alignment due to an electric field formed by the pixel electrode PE and the common electrode CE, thereby allowing light transmittance.

The FPCB 40 electrically connects the display panel 100 to the PCB 30. The FPCB 40 includes a base film 41, and an integrated circuit chip 42 formed on the base film 41.

An end of the FPCB 40 is electrically connected to the display panel 10. The other end of the FPCB 40 can be electrically connected to the PCB 30.

In FIG. 1, two FPCBs 40 are shown, but the number of FPCBs 40 can vary.

The PCB 30 can drive the display panel 10. The PCB 30 can supply a drive signal to the first display substrate 100. The PCB 30 can include a drive substrate (not shown), and a plurality of circuit components embedded in the drive substrate.

Figure 3:
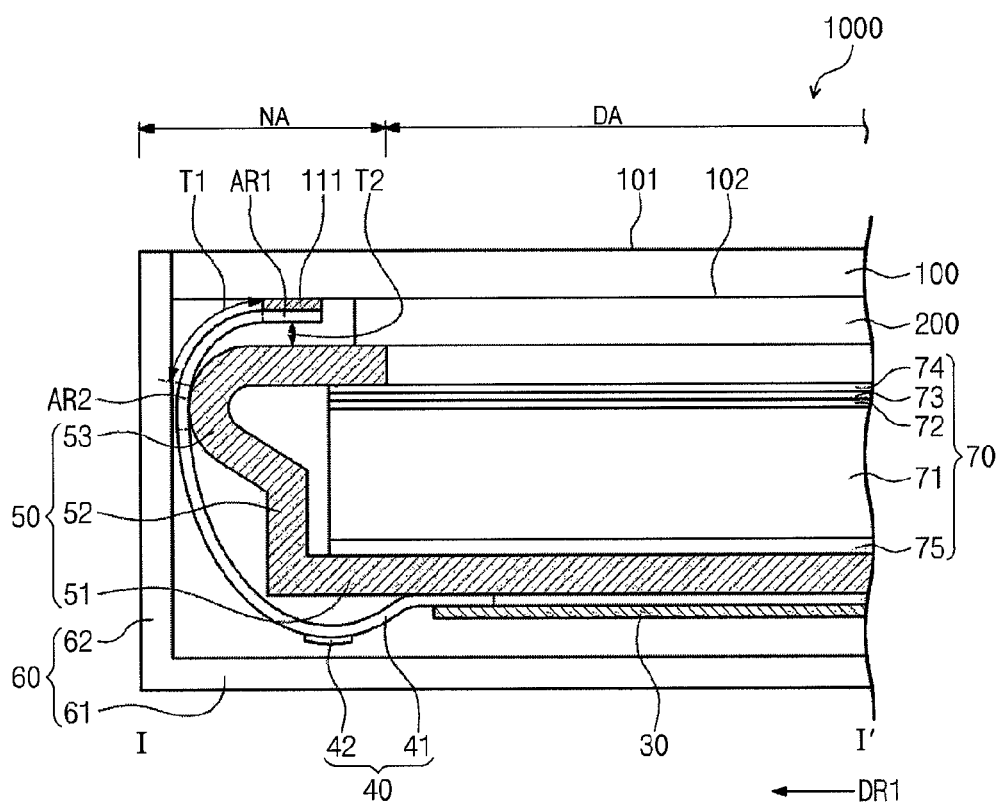
FIG. 3 is a cross-sectional view taken by I-I' of FIG. 1.

FIG. 3 is a cross-sectional view taken by I-I' of FIG. 1 when the FPCB is bent.

Referring to FIGS. 1 and 3, the first display substrate 100 can include a first plane 101 where an image is displayed, and a second plane 102 opposite to the first plane 101. If an image is displayed from the display apparatus 1000, a user can recognize the image through the first plane 101. The second display substrate 200 can be opposite to the second plane 102.

The first display substrate 100 can be wider than the second display substrate 200. A pad electrode 111 is formed on the first display substrate 100 where the first display substrate 100 does not overlap the second display substrate 200. The pad electrode 111 can be bonded and electrically connected to the FPCB 40. The pad electrode 111 can be formed on the same layer as one of the gate electrode GE, the source electrode SE, the drain electrode DE, and the pixel electrode PE.

The display apparatus 1000 can further include a mold frame 50.

The mold frame 50 can accommodate and support the second display substrate 200.

The mold frame 50 can include a bottom frame 51, a sidewall frame 52, and a guide frame 53.

The bottom frame 51 can be provided as a flat plate. The sidewall frame 52 extends upward from an edge of the bottom frame 51.

The guide frame 53 can be connected to an upper part of the sidewall frame 52, and convexly bend toward an edge direction DR1 from the center of the first display substrate 100. The guide frame 53 can protrude in the edge direction DR1 from the center of the first display substrate 100.

The bottom frame 51, the sidewall frame 52 and the guide frame 53 can be formed as one body. The mold frame 50 can be made of, for example, a stiff metal such as stainless steel, or a highly radiative material such as aluminum or aluminum alloy.

The FPCB 40 can be attached to the first display substrate 100 and bend toward a lower part of the mold frame 50.

The FPCB 40 can include a first area AR1 and a second area AR2. The first area AR1 can be attached to the pad electrode 111. The second area AR2 can contact and be guided by the guide frame 53.

The first area AR1 can be isolated by a predetermined distance T1 from the second area AR2. The first area AR1 can be isolated by a predetermined distance T2 from the guide frame 53.

The display apparatus 1000 can further include a top cover 60 and a backlight unit 70.

The top cover 60 can accommodate the display panel 10, the mold frame 50, the FPCB 40, and the PCB 30.

The top cover 60 can include a bottom cover 61 and a sidewall cover 62. The bottom cover 61 has a substantially flat surface. The sidewall cover 62 extends upward from an edge of the bottom cover 61. The sidewall cover 62 can cover a sidewall of the first display substrate 100.

The backlight unit 70 can be accommodated in the mold frame 50.

The backlight unit 70 can include a light source (not shown), a light guiding plate 71, optical sheets 72, 73 and 74, and a reflection plate 75.

The light source supplies light. The light source can be formed close to a side of the light guiding plate 71 and can be provided with more than one. The light source can be a light emission diode.

The light guiding plate 71 can guide light incident from the light source upward and output the guided light upward.

The optical sheets 72~74 are placed on the light guiding plate 71, increasing optical efficiency of light output from the light guiding plate 71.

The optical sheets 72~74 can include a spreading sheet 72, a concentrating sheet 73, and a protection sheet 74 in sequence. The spreading sheet 72 can diffuse incident light. The concentrating sheet 73 can condense the diffused light, increasing luminance thereof. The protection sheet 74 can cover the concentrating sheet 73, allowing a viewing angle therefor. Although FIG. 3 illustrates that the optical sheets 72~74 include 3 members, the number of optical sheets is not limited thereto.

The reflection plate 75 is formed under the light guiding plate 71. The reflection plate 75 can reflect partial light that is output from the light source but leak without being incident on the light guiding plate 71.

Although the backlight unit 70 is exemplified as an edge-type backlight unit in which the light source is formed at an edge of the light guiding plate, it can be a direct-type backlight unit in which the light source is formed on the bottom frame 51. In this case, the light guiding plate can be omitted.

If the display panel 10 is an LCD panel, the backlight unit 70 is included in the display apparatus 1000. Otherwise, if the display panel 10 is a chemiluminescent display panel (e.g., OLED display panel), the backlight unit 70 is not included. The FPCB 40 is attached to the first display substrate 100, and the FPCB 40 can be stressed by bending toward or at least partially around the mold frame 50. Furthermore, the FPCB 40 can be overheated to thermally expand, and a shear stress can be applied to the first AR1 by pad electrode 111.

For the display apparatus 1000 according to an embodiment of the described technology, a first position where substantially the maximum bending stress is generated against the FPCB 40 can be different from a position where substantially the maximum shear stress is generated against the FPCB 40.

The first position can be within the second area AR2. The FPCB 40 can have substantially the maximum curvature in the second area AR2.

The second position can be within the first area AR1. In detail, the second position can be an end of the first area AR1, which is adjacent to the second area AR2.

Without the guide frame 53, the first position is substantially the same as the second position because the FPCB 40 has substantially the maximum curvature at the end of the first area AR1, which is adjacent to the second area AR2.

Figure 4A:
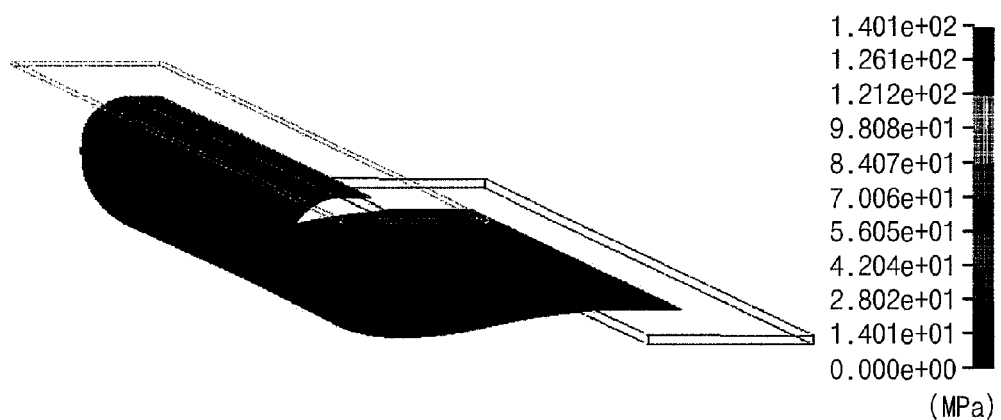
FIG. 4A illustrates a simulation result obtained from bending stress against an FPCB in a comparison model.
Figure 4B:
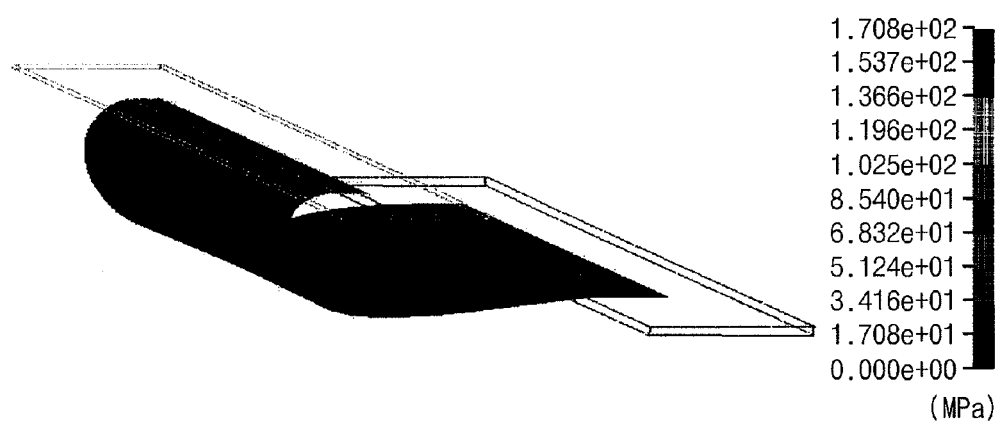
FIG. 4B illustrates a simulation result obtained from shear stress against an FPCB in a comparison model.
Figure 5A:
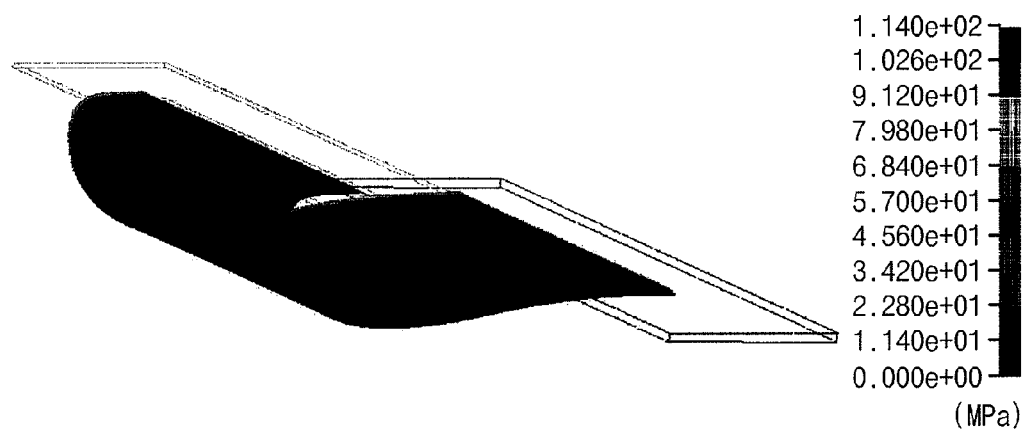
FIG. 5A illustrates a simulation result obtained from bending stress against an FPCB in an embodiment.
Figure 5B:
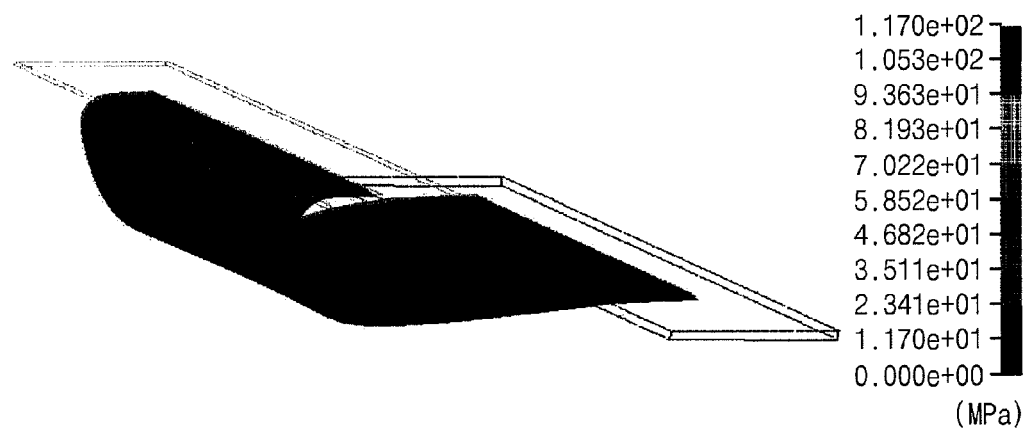
FIG. 5B illustrates a simulation result obtained from shear stress against an FPCB in an embodiment.

FIG. 4A illustrates a simulation result obtained from applying bending stress against an FPCB in a typical display apparatus. FIG. 4B illustrates a simulation result obtained from applying shear stress against an FPCB in a typical display apparatus. FIG. 5A illustrates a simulation result obtained from applying bending stress against an FPCB in an embodiment of the described technology. FIG. 5B illustrates a simulation result obtained from applying shear stress against an FPCB in an embodiment of the described technology.

Table 1 summarily shows the maximum bending and shear stress values taken from the results of FIGS. 4A through 5B.

TABLE 1

|  | Comparison models of FIGS. 4A and 4B | Comparison models of FIGS. 5A and 5B |
|---|---|---|
| Maximum bending stress [Mpa] | 140.1 | 114.0 |
| Maximum shear stress [Mpa] | 170.8 | 117.0 |

Referring to FIGS. 4A through 5B and Table 1, rather than the comparison models without the guide frame 53, the bending and shear stress values are all reduced in the FPCB 40 according to an embodiment of the described technology. In other words, the maximum bending stress and the maximum shear stress, against the FPCB 40 according to an embodiment of the described technology, were reduced down to about 19% and about 33%, respectively.

With the display apparatus 1000 according to this embodiment of the described technology, the shear and bending stress against the FPCB 40 can be reduced so as to prevent cracking of the connection lines embedded in the FPCB 40, thus lengthening the lifespan of the FPCB 40.

Figure 6:
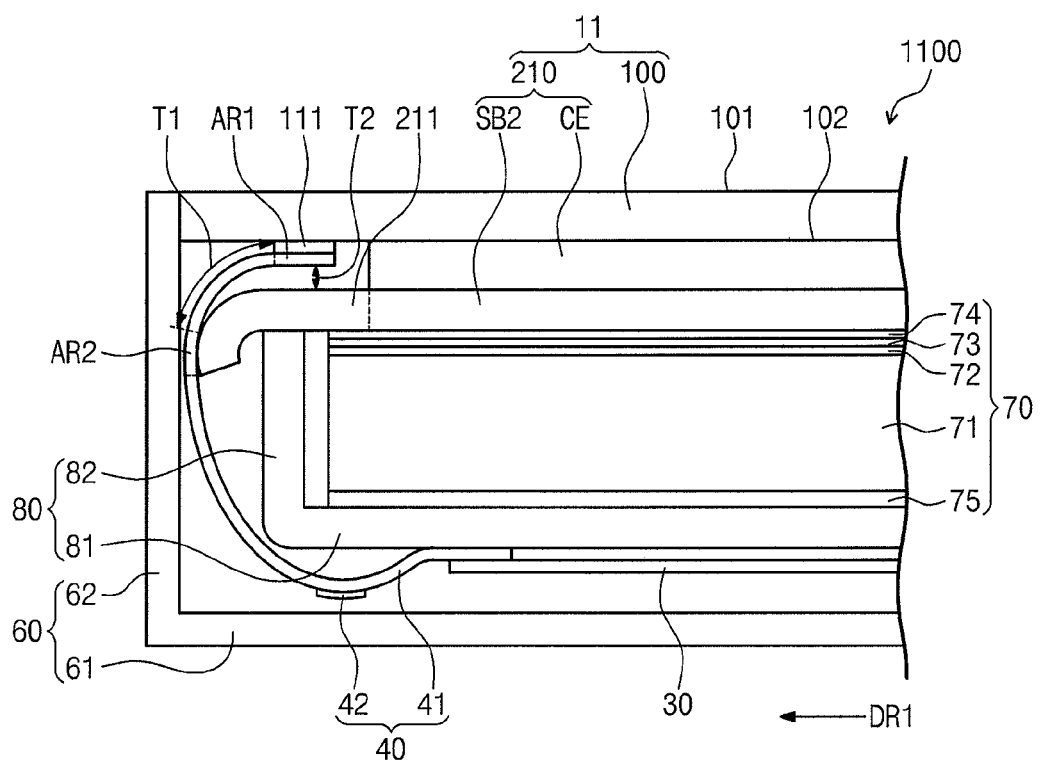
FIG. 6 is a sectional view illustrating a display apparatus according to another embodiment.

FIG. 6 is a sectional view illustrating a display apparatus 1100 according to another embodiment of the described technology.

The display apparatus 1100 shown in FIG. 6 is different from the display apparatus 1000, of FIGS. 1 through 3, in regard to at least the mold frame and the guiding portion. In describing the described technology with reference to drawings, like reference numerals are used for elements that are substantially identical or correspond to each other, and the descriptions thereof will not be repeated for simplicity.

The display panel 11 includes a first display substrate 100, a second display substrate 210, and a guiding portion 211.

The second display substrate 210 can include a second insulation substrate SB2, a shading layer (not shown), and a common electrode CE. The shading layer can be formed between the second insulation substrate SB2 and the common electrode CE, but is omitted from FIG. 6 for convenience of illustration.

The second insulation substrate SB2 can have a smaller area than the first display substrate 100.

The guiding portion 211 can be formed adjacent to the second insulation substrate SB2, and convexly bent in the edge direction DR1 from the center of the second display substrate 210. The guiding portion, mold frame 80 and pad electrode 111 can protrude in the edge direction DR1 from the center of the second display substrate. The guiding portion 211 can protrude more than the mold frame 80 and the pad electrode 111.

The guiding portion 211 and the second insulation substrate SB2 can be formed integrally. In some embodiments, the guiding portion 211 can be additionally attached to the second insulation substrate SB2.

The mold frame 80 can accommodate and support the second display substrate 200.

The mold frame 80 can include a bottom frame 81 and a sidewall frame 82.

The bottom frame 81 can be substantially flat. The sidewall 82 extends upward from an edge of the bottom frame 81. The sidewall 82 can support the guiding portion 211.

The FPCB 40 can include a first area AR1 and a second area AR2. The first area AR1 can be attached to the pad electrode 111. The second area AR2 can contact and be guided by the guiding portion 211.

The first area AR1 can be isolated from the second area AR2 in a predetermined distance T1. The first area AR1 can be isolated from the guiding portion 211 in a predetermined distance T2.

For the display apparatus 1100 according to an embodiment of the described technology, a first position where substantially the maximum bending stress is generated against the FPCB 40 can be different from a second position at which substantially the maximum shear stress is generated against the FPCB 40.

The first position can be within the second area AR2. The FPCB 40 can have substantially the maximum curvature in the second area AR2.

The second position can be within the first area AR1. The second position can be an end of the first area AR1, which is adjacent to the second area AR2.

In the display apparatus 1100 according to this embodiment of the described technology, the guiding portion 211 can function as the guide frame 50 of the former embodiment shown in FIGS. 1 and 3. Since the guiding portion 211 can be formed in one body together with the second insulation substrate SB2, the display apparatus 1100 according to this embodiment can have a smaller thickness than the display apparatus 1000 according to the former embodiment.

Figure 7:
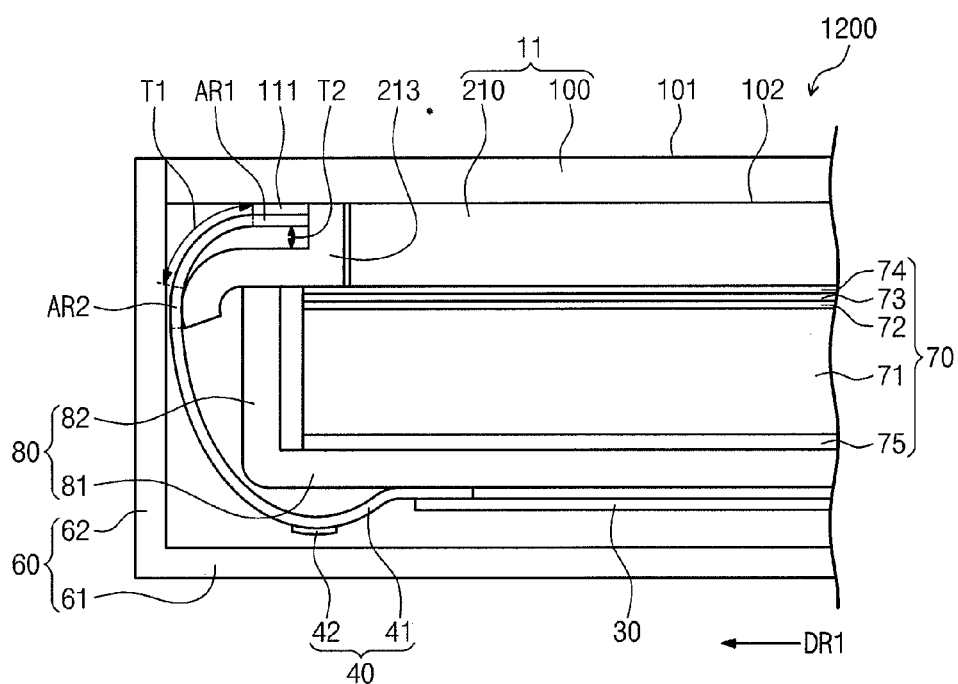
FIG. 7 is a sectional view illustrating a display apparatus according to another embodiment.

FIG. 7 is a sectional view illustrating a display apparatus 1200 according to another embodiment of the described technology.

The display apparatus 1200 shown in FIG. 7 is different from the display apparatus 1000 of FIG. 6 in at least the guiding portion, while the rest of the components can be substantially the same as described above.

A guiding portion 213 can contact the second plane 102 of the first display substrate 100. The guiding portion 213 can protrude in the vertical direction from the second plane 102 and then extend in the edge direction SR1 from the center of the second display substrate 210. The guiding portion 213 can be convexly bent in the edge direction DR1 from the center of the second display substrate 210. The guiding portion 213 can protrude more than the mold frame 80 and the pad electrode 111, in the edge direction DR1 from the center of the second display substrate 213.

The guiding portion 213 can be isolated from the second display substrate 210.

As described above, with the display apparatus according to the described technology, the bending and shear stress against the FPCB can be reduced to prevent cracking of the connection lines in the FPCB, lengthening the lifespan of the FPCB.

While the inventive technology has been described with reference to exemplary embodiments, it will be apparent to those skilled in the art that various changes and modifications can be made without departing from the spirit and scope of the present invention. Therefore, it should be understood that the above embodiments are not limiting, but illustrative.

What is claimed is:

1. A display apparatus, comprising:
    a first display substrate including a display area and a non-display area and further including i) a first surface on which an image is displayed, which is an outermost surface on a viewer side, and ii) a second surface opposite to the first plane;
    a second display substrate overlapping the second surface;
    a mold frame configured to support the second display substrate and to overlap the second surface in a plan view, an accommodation space being provided in the mold frame, wherein the mold frame includes a guide frame that is bent;
    a flexible printed circuit board (FPCB) including i) a first area attached to the second surface of the first display substrate and ii) a second area connected to and guided by the guide frame, wherein the FPCB is bent at least partially around the mold frame; and a printed circuit board (PCB) electrically contacting the FPCB and configured to provide a drive signal to the first display substrate, wherein the non-display area of the first display substrate protrudes more than the guide frame toward a direction from a center of the first display substrate to an edge of the first display substrate.

2. The display apparatus according to claim 1, wherein a first position where substantially the maximum bending stress is generated against the FPCB is different from a second position where the maximum shear stress is generated against the FPCB.

3. The display apparatus according to claim 2, wherein the first position is within the second area.

4. The display apparatus according to claim 3, wherein the second position is within the first area.

5. The display apparatus according to claim 1, wherein the mold frame further includes:
   a bottom frame; and
   a sidewall frame extending from an edge of the bottom frame towards the first display substrate,
   wherein the guide frame is connected to an upper part of the sidewall frame and convexly bent towards the FPCB from the center of the first display substrate.

6. The display apparatus according to claim 5, wherein the first display substrate further comprises:
   an insulation substrate including a display area and a non-display area; and
   a pad electrode disposed on the insulation substrate and attached to the FPCB and totally overlapping the non-display area, wherein the pad electrode protrudes in the same direction as that of the guide frame, and
   wherein the guide frame protrudes more than the pad electrode.

7. The display apparatus according to claim 1, wherein the first and second areas of the FPCB are spaced apart from each other by a predetermined distance.

8. The display apparatus according to claim 7, wherein the guide frame and the first area of the FPCB are spaced apart from each other by a predetermined distance.

9. The display apparatus according to claim 1, further comprising:
   a top cover configured to accommodate the first display substrate, the second display substrate, the mold frame, the FPCB, and the PCB.

10. The display apparatus according to claim 9, wherein the top cover comprises:
    a bottom cover; and
    a sidewall cover extending from an edge of the bottom cover and covering a side of the first display substrate.

11. The display apparatus according to claim 1, further comprising:
    a liquid crystal layer formed between the first display substrate and the second display substrate; and
    a backlight unit accommodated in the mold frame.

12. A display apparatus, comprising:
    a first display substrate including a display area and a non-display area and further including i) a first surface on which an image is displayed, which is an outermost surface on a viewer side, and ii) a second surface opposite to the first surface;
    a second display substrate formed to be overlapping the second surface;
    a guiding portion bent to be overlapping the second surface in a plan view and connected to at least one of the first and second display substrates;
    a mold frame supporting the second display substrate, an accommodation space is provided in the mold frame;
    a flexible printed circuit board (FPCB) including i) a first area attached to the second surface of the first display substrate and ii) a second area contacting and guided by the guiding portion, wherein the FPCB is bent at least partially around the mold frame, wherein the non-display area of the first display substrate protrudes more than the guide frame toward a direction from a center of the first display substrate to an edge of the first display substrate.

13. The display apparatus according to claim 12, wherein a first position where substantially the maximum bending stress is generated against the FPCB is different from a second position where substantially the maximum shear stress is generated against the FPCB.

14. The display apparatus according to claim 13, wherein the first position is within the second area.

15. The display apparatus according to claim 14, wherein the second position is within the first area.

16. The display apparatus according to claim 12, wherein the second display substrate comprises an insulation substrate,
    wherein the guiding portion is formed adjacent to the insulation substrate and convexly bent toward the FPCB.

17. The display apparatus according to claim 12, wherein the mold frame protrudes toward the FPCB, and wherein the guiding portion protrudes more than the mold frame.

18. The display apparatus according to claim 12, wherein the mold frame supports the guiding portion.

19. The display apparatus according to claim 12, further comprising:
    a top cover accommodating the first display substrate, the second display substrate, the mold frame, and the FPCB.

20. The display apparatus according to claim 12, wherein the guiding portion contacts the second surface of the first display substrate.

21. The display apparatus according to claim 1, further comprising a pad electrode directly contacting the FPCB and the second surface of the first display substrate.

* * * * *